US012523055B2

(12) United States Patent
Tate

(10) Patent No.: US 12,523,055 B2
(45) Date of Patent: Jan. 13, 2026

(54) BURIAL VAULT ASSEMBLY

(71) Applicant: Linda Tate, Desoto, TX (US)

(72) Inventor: Linda Tate, Desoto, TX (US)

( * ) Notice: Subject to any disclaimer, the term of this patent is extended or adjusted under 35 U.S.C. 154(b) by 223 days.

(21) Appl. No.: 18/243,194

(22) Filed: Sep. 7, 2023

(65) Prior Publication Data

US 2025/0084662 A1 Mar. 13, 2025

(51) Int. Cl.
*E04H 13/00* (2006.01)
*A61G 17/007* (2006.01)
*A61G 17/02* (2006.01)

(52) U.S. Cl.
CPC ......... *E04H 13/00* (2013.01); *A61G 17/0136* (2017.05); *A61G 17/02* (2013.01)

(58) Field of Classification Search
CPC .... E04H 13/00; A61G 17/0136; A61G 17/02; A61G 17/04
See application file for complete search history.

(56) References Cited

U.S. PATENT DOCUMENTS 3,050,818 A * 8/1962 Phillips .............. A61G 17/0136 27/35
3,897,663 A 8/1975 Gaul
5,381,591 A 1/1995 Ponger
5,511,345 A * 4/1996 Jones ........................ E04C 2/20 52/630
5,659,932 A * 8/1997 Wright ................. A61G 17/048 27/7
5,680,682 A 10/1997 Watkins
5,746,030 A * 5/1998 Sannipoli, Sr. ......... E04H 13/00 52/136
6,318,030 B1 * 11/2001 McClure ................. E04H 13/00 27/35
7,458,138 B2 * 12/2008 Spiers ..................... E04H 13/00 27/29
10,596,055 B1 * 3/2020 Fernandez ......... A61G 17/0136
D888,362 S 6/2020 Atkinson
11,021,889 B2 6/2021 Portal
11,566,439 B2 * 1/2023 Schwab ................ E04H 13/005
2008/0196225 A1 8/2008 Pruitt
2013/0067705 A1 * 3/2013 Williamson ........... A61G 17/02 27/14
2020/0340265 A1 * 10/2020 Schwab ................ E04H 13/005
2022/0170286 A1 6/2022 Schwarzbaum
2024/0115453 A1 * 4/2024 Fernandez ........... A61G 17/034

FOREIGN PATENT DOCUMENTS

WO WO-9427550 A1 * 12/1994 ........... A61G 17/004
WO WO-2022175554 A1 * 8/2022 ......... A61G 17/0136

* cited by examiner

*Primary Examiner* — Babajide A Demuren

(57) ABSTRACT

A burial vault assembly for vertically stacking decedents in a cemetery includes a vault that has a plurality of stacking channels structurally integrated into the vault. The vault is buried beneath the ground having the plurality of stacking channels being vertically oriented. A plurality of caskets is each stackable in a respective one of the plurality of stacking channels in the burial vault to facilitate the decedent in each of the plurality of caskets to be buried. A plurality of casket lids is each attachable to a respective one of the plurality of caskets for closing the respective casket. A plurality of vault lids is each positionable over a respective one of the plurality of stacking channels in the vault for closing the respective stacking channel.

5 Claims, 5 Drawing Sheets

BURIAL VAULT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to burial devices and more particularly pertains to a new burial device for vertically stacking decedents in a cemetery. The device includes a burial vault that has a plurality of stacking channels that are vertically oriented with the burial vault is buried. A plurality of caskets is provided and each of the caskets is comprised of a translucent material to facilitate a decedent in each casket to be visible. Each of the plurality of caskets is vertically stacked in a respective stacking channel until each of the stacking channels is filled with caskets.

(2) Description of Related Art Including Information Disclosed Under 37 CFR 1.97 and 1.98

The prior art relates to burial devices including a variety of above ground burial vaults that have horizontally oriented storage slots for storing caskets and a modular burial system involving rectangular burial spaces being attachable together. In no instance does the prior art disclose a burial vault device that includes a vault with vertically oriented stacking channels and a plurality of caskets that are stackable in each of the stacking channels for reducing the footprint of the caskets in a cemetery.

BRIEF SUMMARY OF THE INVENTION

An embodiment of the disclosure meets the needs presented above by generally comprising a vault that has a plurality of stacking channels structurally integrated into the vault. The vault is buried beneath the ground having the plurality of stacking channels being vertically oriented. A plurality of caskets is each stackable in a respective one of the plurality of stacking channels in the burial vault to facilitate the decedent in each of the plurality of caskets to be buried. A plurality of casket lids is each attachable to a respective one of the plurality of caskets for closing the respective casket. A plurality of vault lids is each positionable over a respective one of the plurality of stacking channels in the vault for closing the respective stacking channel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
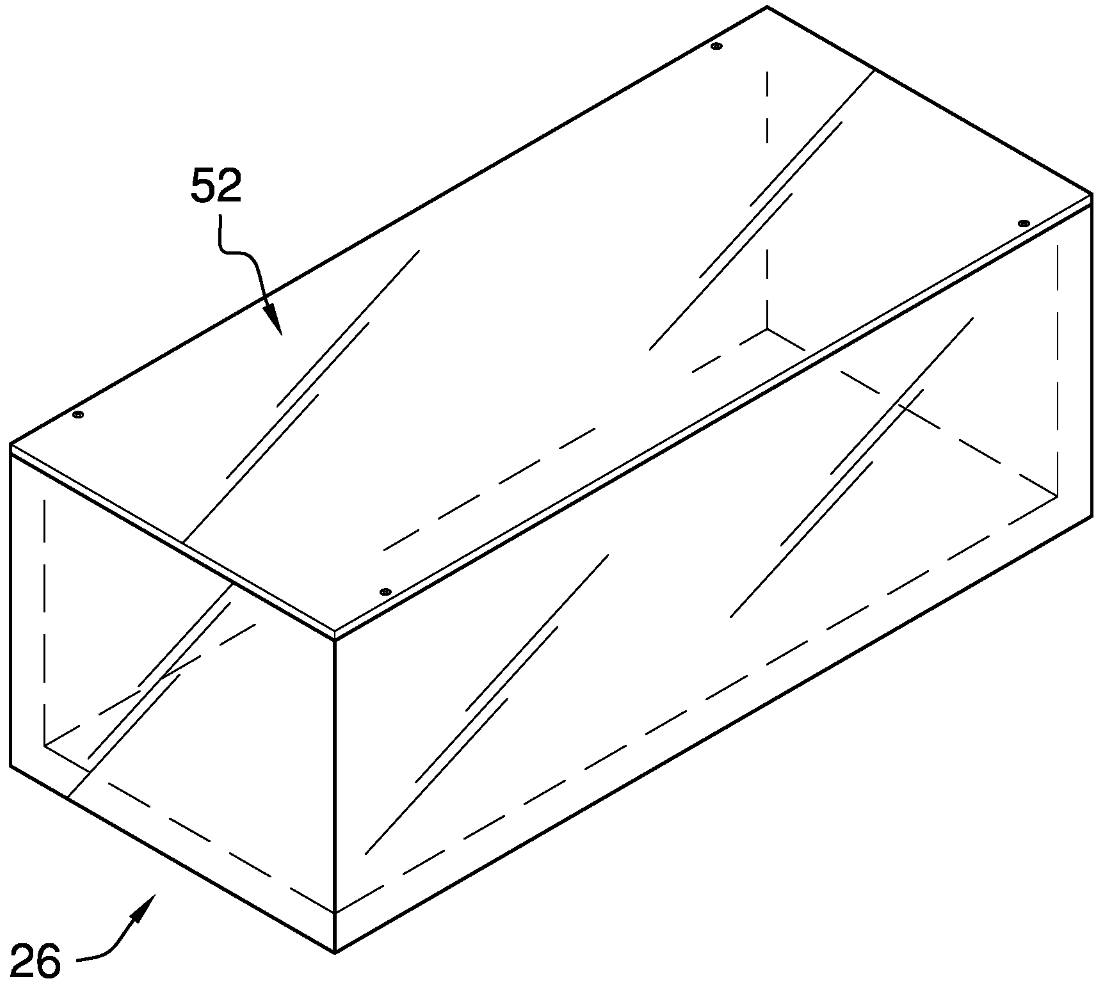
FIG. 1 is a top perspective view of casket of an embodiment of the disclosure.
Figure 2:
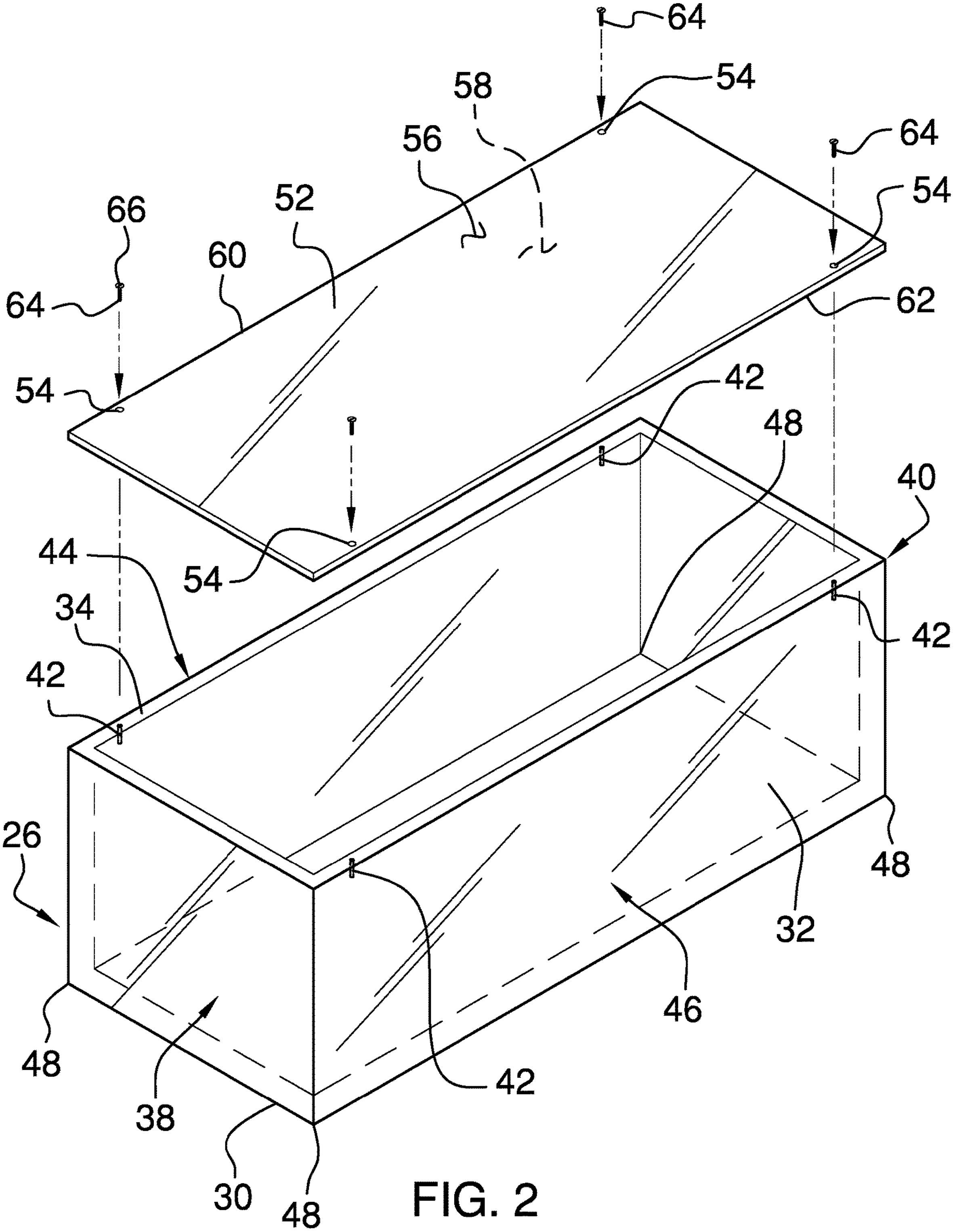
FIG. 2 is an exploded perspective view of an embodiment of the disclosure.
Figure 3:
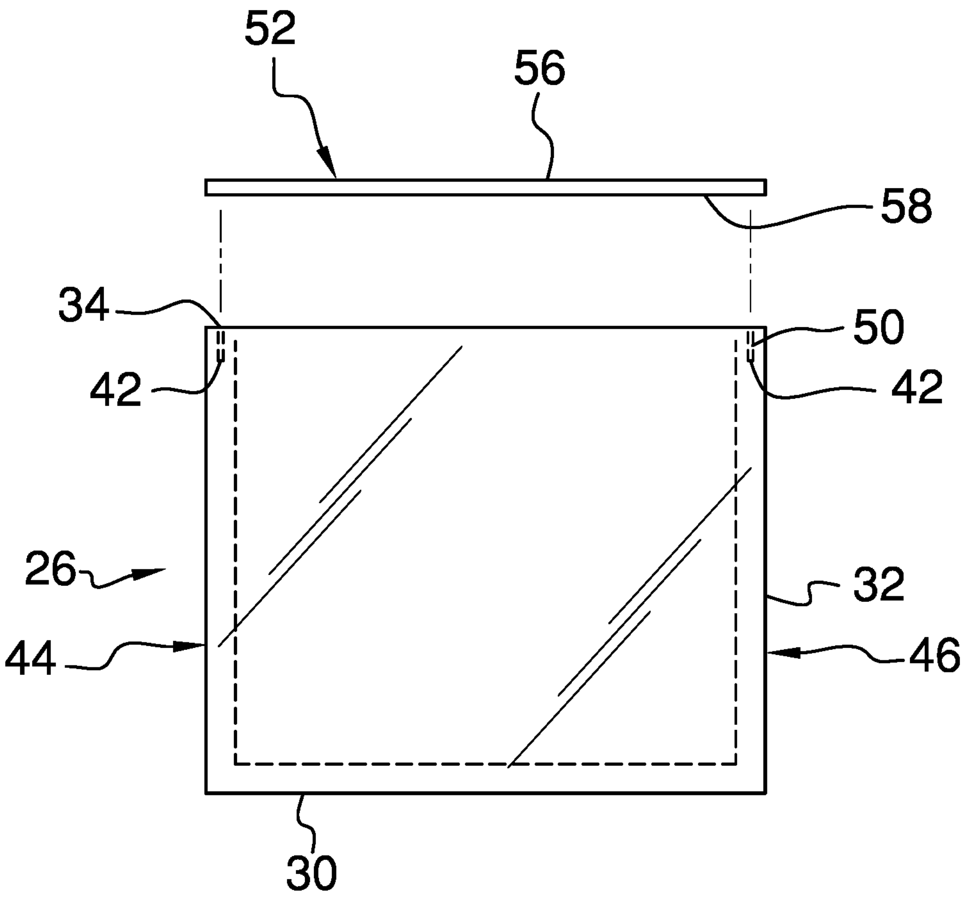
FIG. 3 is a right side exploded view of an embodiment of the disclosure.
Figure 4:
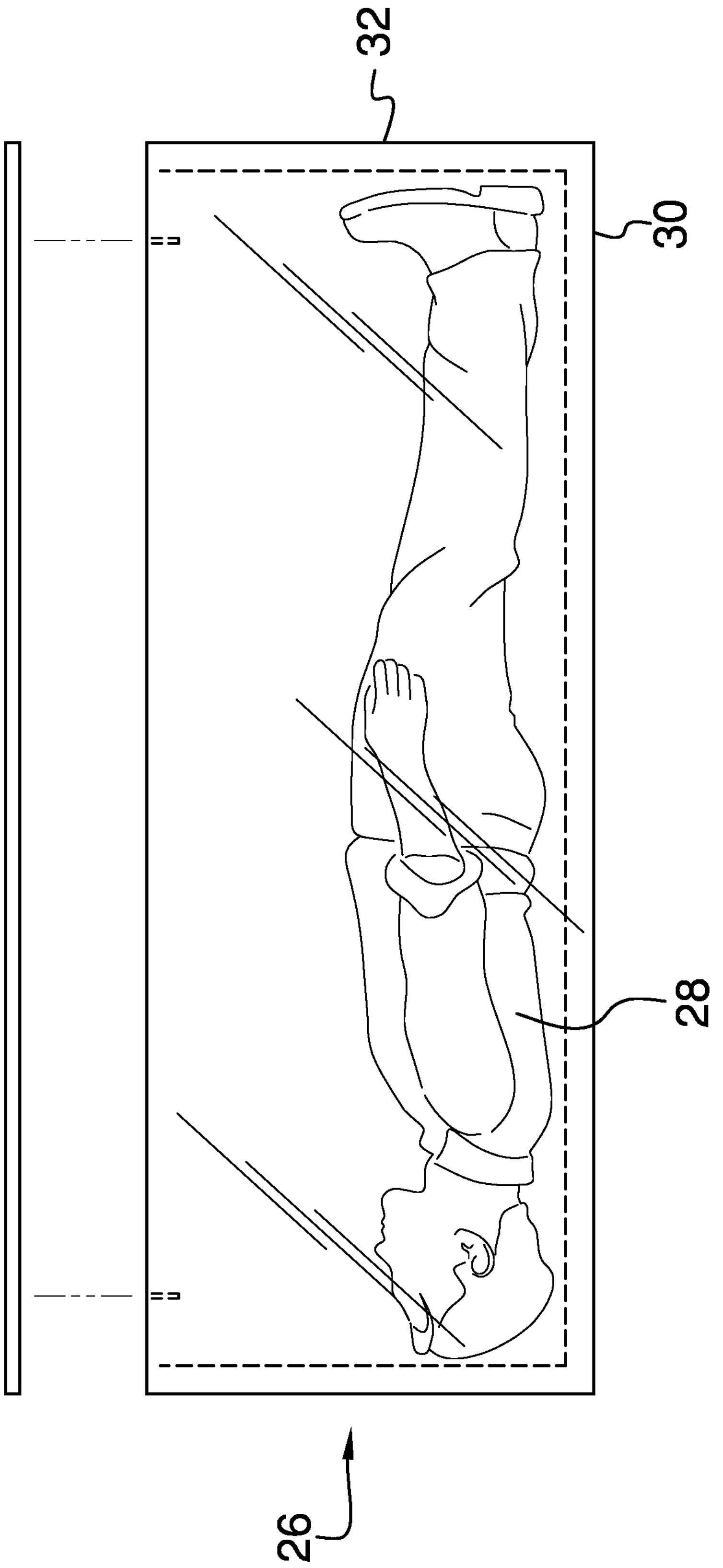
FIG. 4 is a perspective in-use view of a casket of an embodiment of the disclosure.
Figure 5:
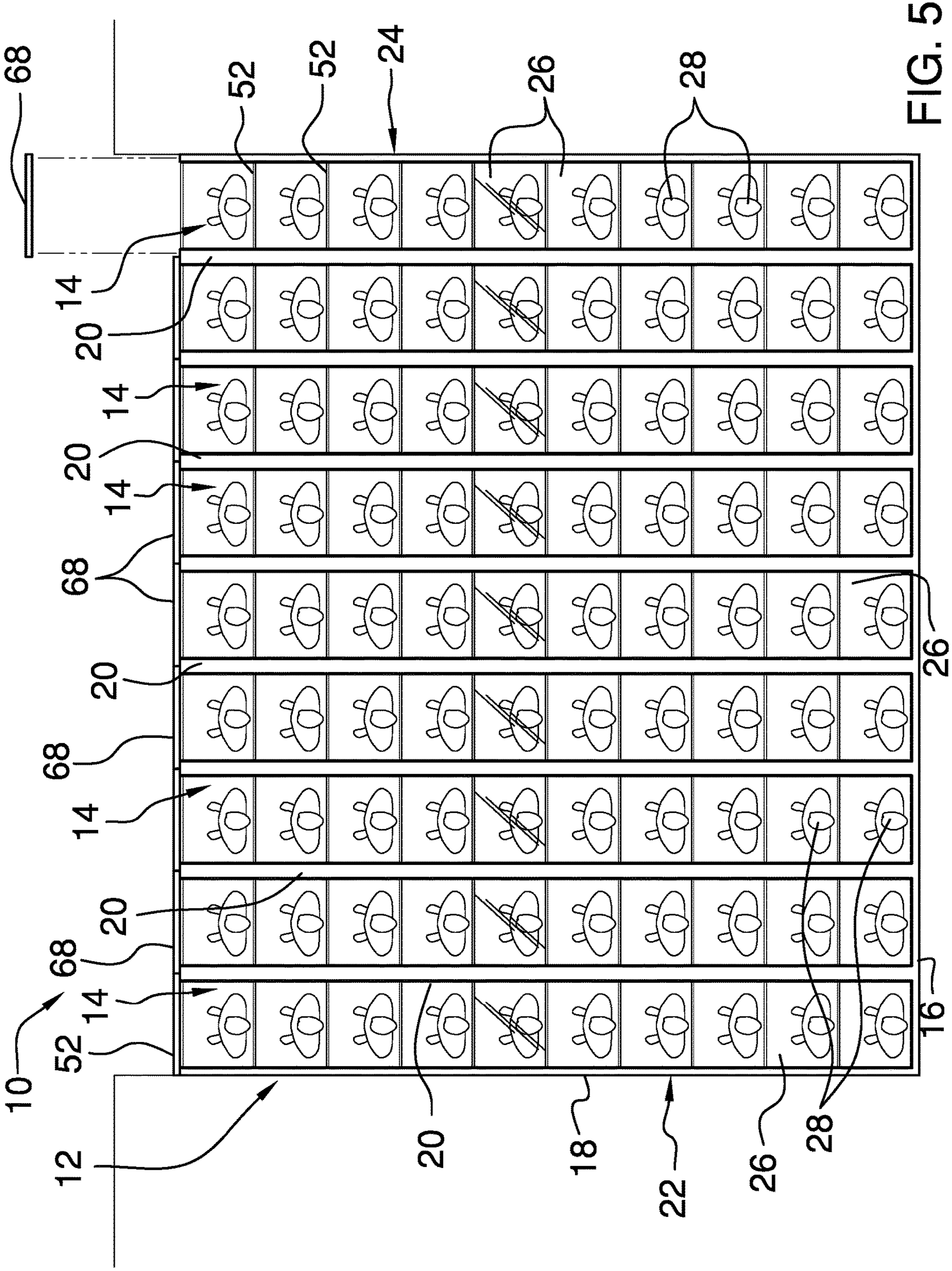
FIG. 5 is a perspective view of a burial vault assembly according to an embodiment of the disclosure.

With reference now to the drawings, and in particular to FIGS. 1 through 5 thereof, a new burial device embodying the principles and concepts of an embodiment of the disclosure and generally designated by the reference numeral 10 will be described.

As best illustrated in FIGS. 1 through 5, the burial vault assembly 10 generally comprises a vault 12 that has a plurality of stacking channels 14 structurally integrated into the vault 12. The vault 12 is buried beneath the ground having the plurality of stacking channels 14 being vertically oriented. Additionally, the vault 12 is comprised of a translucent material, including but not being limited to polycarbonate, to pass light through the vault 12. The vault 12 has a bottom wall 16 and an outer wall 18 extending upwardly from the bottom wall 16 and the vault 12 has a plurality of dividing walls 20 each extending upwardly from the bottom wall 16. The dividing walls 20 are evenly spaced apart from each other and are distributed between a first lateral side 22 and a second lateral side 24 of the outer wall 18 thereby defining each of the stacking channels 14 between respective pairs of the dividing walls 20. The vault 12 may have a length at least 11.5 meters, a width of at least 2.0 meters and a height of at least 10.5 meters. Additionally, each of the stacking channels 14 may have a width of approximately 1.0 meter.

A plurality of caskets 26 is provided and each of the plurality of caskets 26 can contain a decedent 28. Each of the caskets 26 is comprised of a translucent material, including but not being limited to polycarbonate, to facilitate the decedent 28 to be visible in the casket in which the decedent 28 is positioned. Each of the plurality of caskets 26 is stackable in a respective one of the plurality of stacking channels 14 in the burial vault 12. In this way each of the plurality of caskets 26 facilitates the decedent 28 in each of the plurality of caskets 26 to be buried.

Each of the plurality of caskets 26 has a lower wall 30 and a perimeter wall 32 extending upwardly from the lower wall 30 and the perimeter wall 32 has an upper edge 34 defining an opening 36 into a respective casket 26. Each of the plurality of caskets 26 is elongated between a front side 38 and a back side 40 of the perimeter wall 32. Additionally, the perimeter wall 32 of each of the plurality of caskets 26 has a plurality of fastener wells 42 each extending into the upper edge 34 of the perimeter wall 32. Each of the plurality of fastener wells 42 associated with a respective casket 26 is positioned on a respective one of a first sidelong side 44 and a second sidelong side 46 of the perimeter wall 32 of the respective casket 26. Furthermore, each of the plurality of fastener wells 42 associated with the respective casket 26 is spaced from a respective one of four corners 48 of the perimeter wall 32 of the respective casket 26 and each of the plurality of fastener wells 42 has a bounding surface 50 that is threaded.

A plurality of casket lids 52 is provided and each of the plurality of casket lids 52 is attachable to a respective one of the plurality of caskets 26 for closing the respective casket 26. Each of the plurality of casket lids 52 is comprised of a translucent material, including but not being limited to polycarbonate, to facilitate the decedent 28 to be visible through the casket lids 52. The plurality of caskets 26 may be manufactured in a large size for adults and a medium size the children and a small size for infants. The large size may have a length of approximately 2.0 meters and a width and height of approximately 1.0 meter and the perimeter wall 32 associated with the large size caskets 26 may have a thickness of less than 5.0 cm. The medium size may have a length of approximately 1.5 meters and a width and height of approximately 0.5 meters and the perimeter wall 32 associated with the medium size caskets 26 may have a thickness of less than 2.5 cm. The small size may have a length and a height and a width of approximately 0.5 meters and the perimeter wall 32 associated with the small size caskets 26 may have a thickness of less than 1.3 cm. Furthermore, the vault 12 may be structured in various dimensions to accommodate either the large size caskets 26, the medium size caskets 26 or the small size caskets 26.

Each of the plurality of casket lids 52 has a plurality of fastener holes 54 each extending through a top surface 56 and a bottom surface 58 of the casket lids 52. Each of the plurality of fastener holes 54 associated with a respective one of the plurality of casket lids 52 is spaced apart from each other and is distributed along a respective one of a first lateral edge 60 and a second lateral edge 62 of the respective casket lid 52. Furthermore, each of the plurality of fastener holes 54 in the respective casket lid 52 is aligned with a respective one of the fastener wells 42 in the perimeter wall 32 of a respective one of the caskets 26 when the respective casket lid 52 is positioned on the respective casket 26.

A plurality of fasteners 64 is provided and respective ones of the plurality of fasteners 64 is extendable through a respective one of the fastener holes 54 in a respective one of the plurality of casket lids 52. Additionally, the respective fasteners 64 threadably engages the bounding surface 50 of a respective one of the plurality of fastener wells 42 in the perimeter wall 32 of a respective one of the caskets 26 for attaching the respective casket lid 52 to the respective casket 26. Each of the plurality of fasteners 64 may comprise a screw or other type of threaded fastener. Additionally, each of the fastener holes 54 in each of the plurality of casket lids 52 may be chamfered to facilitate a head 66 of each of the fasteners 64 to lie flush with the top surface 56 of the respective casket lid 52. A plurality of vault lids 68 is provided and each of the plurality of vault lids 68 is positionable over a respective one of the plurality of stacking channels 14 in the vault 12 for closing the respective stacking channel. Each of the plurality of vault lids 68 is comprised of a translucent material, including but not being limited to polycarbonate, to facilitate light to pass through the vault lids 68.

In use, a hole is dug in the ground, typically located in a cemetery, which has sufficient dimensions to accommodate the vault 12 and the vault 12 is lowered into the hole. A decedent 28 is positioned in a respective casket 26 and a respective one of the casket lids 52 is attached to the respective casket 26. The respective casket 26 is lowered into a respective stacking channel 14 in the vault 12 and subsequent caskets 26 are stacked atop one another in the respective stacking channel 14 until the respective stacking channel 14 is filled with caskets 26. The process of placing caskets 26 in the stacking channels 14 is repeated until the vault 12 is filled with caskets 26. In this way the vault 12 and the plurality of caskets 26 reduces the footprint occupied by the plurality of caskets 26 in a cemetery thereby increasing the number of caskets 26 that can be buried in the cemetery.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A burial vault assembly for facilitating a plurality of decedents to be buried in plurality of columns thereby reducing the area occupied by the decedents, said assembly comprising:

a vault having a plurality of stacking channels being structurally integrated into said vault wherein said vault is configured to be buried beneath the ground having said plurality of stacking channels being vertically oriented;

a plurality of caskets each being configured to contain a decedent, each of said caskets being comprised of a translucent material wherein each of said caskets is configured to facilitate the decedent to be visible in said casket in which the decedent is positioned, each of said plurality of caskets being stackable in a respective one of said plurality of stacking channels in said burial vault wherein each of said plurality of caskets is configured to facilitate the decedent in each of said plurality of caskets to be buried;

a plurality of casket lids, each of said plurality of casket lids being attachable to a respective one of said plurality of caskets for closing said respective casket, each of said plurality of casket lids being comprised of a translucent material wherein each of said plurality of casket lids is configured to facilitate the decedent to be visible through said casket lids;

a plurality of vault lids, each of said plurality of vault lids being positionable over a respective one of said plurality of stacking channels in said vault for closing said respective stacking channel;

wherein said vault has a bottom wall and an outer wall extending upwardly from said bottom wall, said vault having a plurality of dividing walls each extending upwardly from said bottom wall, said dividing walls being evenly spaced apart from each other and being distributed between a first lateral side and a second lateral side of said outer wall thereby defining each of said stacking channels between respective pairs of said dividing walls; and wherein said vault is comprised of a translucent material wherein said vault is configured to pass light through said vault.

2. A burial vault assembly for facilitating a plurality of decedents to be buried in plurality of columns thereby reducing the area occupied by the decedents, said assembly comprising:

a vault having a plurality of stacking channels being structurally integrated into said vault wherein said vault is configured to be buried beneath the ground having said plurality of stacking channels being vertically oriented;

a plurality of caskets each being configured to contain a decedent, each of said caskets being comprised of a translucent material wherein each of said caskets is configured to facilitate the decedent to be visible in said casket in which the decedent is positioned, each of said plurality of caskets being stackable in a respective one of said plurality of stacking channels in said burial vault wherein each of said plurality of caskets is configured to facilitate the decedent in each of said plurality of caskets to be buried;

a plurality of casket lids, each of said plurality of casket lids being attachable to a respective one of said plurality of caskets for closing said respective casket, each of said plurality of casket lids being comprised of a translucent material wherein each of said plurality of casket lids is configured to facilitate the decedent to be visible through said casket lids;

a plurality of vault lids, each of said plurality of vault lids being positionable over a respective one of said plurality of stacking channels in said vault for closing said respective stacking channel;

wherein each of said plurality of caskets has a lower wall and a perimeter wall extending upwardly from said lower wall, said perimeter wall having an upper edge defining an opening into a respective casket, each of said plurality of caskets being elongated between a front side and a back side of said perimeter wall;

wherein said perimeter wall of each of said plurality of caskets has a plurality of fastener wells each extending into said upper edge of said perimeter wall, each of said plurality of fasteners wells associated with a respective casket being positioned on a respective one of a first sidelong side and a second sidelong side of said perimeter wall of said respective casket, each of said plurality of fastener wells associated with said respective casket being spaced from a respective one of four corners of said perimeter wall of said respective casket; and wherein each of said plurality of fastener wells has a bounding surface being threaded.

3. The assembly according to claim 2, wherein:

each of said plurality of casket lids has a plurality of fastener holes each extending through a top surface and a bottom surface of said casket lids, each of said plurality of fastener holes associated with a respective one of said plurality of casket lids being spaced apart from each other and being distributed along a respective one of a first lateral edge and a second lateral edge of said respective casket lid; and each of said plurality of fastener holes in said respective casket lid is aligned with a respective one of said fastener wells in said perimeter wall of a respective one of said caskets when said respective casket lid is positioned on said respective casket.

4. The assembly according to claim 3, further comprising a plurality of fasteners, respective ones of said plurality of fasteners being extendable through a respective one of said fastener holes in a respective one of said plurality of casket lids and threadably engaging said bounding surface of a respective one of said plurality of fastener wells in said perimeter wall of a respective one of said caskets for attaching said respective casket lid to said respective casket.

5. A burial vault assembly for facilitating a plurality of decedents to be buried in plurality of columns thereby reducing the area occupied by the decedents, said assembly comprising:

a vault having a plurality of stacking channels being structurally integrated into said vault wherein said vault is configured to be buried beneath the ground having said plurality of stacking channels being vertically oriented, said vault is comprised of a translucent material wherein said vault is configured to pass light through said vault, said vault having a bottom wall and an outer wall extending upwardly from said bottom wall, said vault having a plurality of dividing walls each extending upwardly from said bottom wall, said dividing walls being evenly spaced apart from each other and being distributed between a first lateral side and a second lateral side of said outer wall thereby defining each of said stacking channels between respective pairs of said dividing walls;

a plurality of caskets each being configured to contain a decedent, each of said caskets being comprised of a translucent material wherein each of said caskets is configured to facilitate the decedent to be visible in said casket in which the decedent is positioned, each of said plurality of caskets being stackable in a respective one of said plurality of stacking channels in said burial vault wherein each of said plurality of caskets is configured to facilitate the decedent in each of said plurality of caskets to be buried, each of said plurality of caskets having a lower wall and a perimeter wall extending upwardly from said lower wall, said perimeter wall having an upper edge defining an opening into a respective casket, each of said plurality of caskets being elongated between a front side and a back side of said perimeter wall, said perimeter wall of each of said plurality of caskets having a plurality of fastener wells each extending into said upper edge of said perimeter wall, each of said plurality of fasteners wells associated with a respective casket being positioned on a respective one of a first sidelong side and a second sidelong side of said perimeter wall of said respective casket, each of said plurality of fastener wells associated with said respective casket being spaced from a respective one of four corners of said perimeter wall of said respective casket, each of said plurality of fastener wells having a bounding surface being threaded;

a plurality of casket lids, each of said plurality of casket lids being attachable to a respective one of said plurality of caskets for closing said respective casket, each of said plurality of casket lids being comprised of a translucent material wherein each of said plurality of casket lids is configured to facilitate the decedent to be visible through said casket lids, each of said plurality of casket lids having a plurality of fastener holes each extending through a top surface and a bottom surface of said casket lids, each of said plurality of fastener holes associated with a respective one of said plurality of casket lids being spaced apart from each other and being distributed along a respective one of a first lateral edge and a second lateral edge of said respective casket lid, each of said plurality of fastener holes in said respective casket lid being aligned with a respective one of said fastener wells in said perimeter wall of a respective one of said caskets when said respective casket lid is positioned on said respective casket;

a plurality of fasteners, respective ones of said plurality of fasteners being extendable through a respective one of said fastener holes in a respective one of said plurality of casket lids and threadably engaging said bounding surface of a respective one of said plurality of fastener wells in said perimeter wall of a respective one of said caskets for attaching said respective casket lid to said respective casket; and a plurality of vault lids, each of said plurality of vault lids being positionable over a respective one of said plurality of stacking channels in said vault for closing said respective stacking channel.

* * * * *